United States Patent [19]

McKendrick

[11] 4,243,060

[45] Jan. 6, 1981

[54] FLUID CONTROL VALVE

[75] Inventor: Lorne J. McKendrick, Westland, Mich.

[73] Assignee: Parts Handling, Inc., Dearborn, Mich.

[21] Appl. No.: 34,957

[22] Filed: May 1, 1979

Related U.S. Application Data

[63] Continuation of Ser. No. 799,041, May 23, 1977, abandoned.

[51] Int. Cl.[3] ........................ F16K 11/07; B66D 1/00; F15B 13/04

[52] U.S. Cl. ................................ 137/625.69; 254/360; 91/428

[58] Field of Search ............................... 254/168, 189; 137/625.69; 251/344, 347, 348; 91/428

[56] References Cited

U.S. PATENT DOCUMENTS

| | | | |
|---|---|---|---|
| 1,630,810 | 5/1927 | Simpson | 91/378 X |
| 3,537,686 | 11/1970 | McKendrick | 254/168 X |
| 3,554,091 | 1/1971 | Spyridakis | 91/428 |
| 3,856,266 | 12/1974 | McKendrick | 254/168 |
| 3,933,388 | 1/1976 | Conboy | 254/168 X |
| 3,998,432 | 12/1976 | Vldricks et al. | 254/168 |

FOREIGN PATENT DOCUMENTS

| | | | |
|---|---|---|---|
| 645526 | 7/1962 | Canada | 254/168 |
| 233338 | 9/1970 | U.S.S.R. | 137/625.69 |

*Primary Examiner*—Martin P. Schwadron
*Assistant Examiner*—A. Michael Chambers
*Attorney, Agent, or Firm*—Gifford, VanOphem, Sheridan & Sprinkle

[57] ABSTRACT

A fluid control valve is provided for use in conjunction with a fluid device and a source of fluid pressure wherein the fluid device includes an expansible fluid chamber which, upon connection to the fluid pressure source, actuates the fluid device while exhaustion of the fluid pressure from the expansible chamber deactuates the fluid device. The fluid control valve, according to the present invention, comprises a valve member and a housing axially slidably disposed over the valve member. The housing further includes a first fluid port adapted for connection with the fluid pressure source, a second fluid port adapted for connection with the expansible chamber of the fluid device and a third fluid port adapted for connection with a source of low fluid pressure. Resilient means are provided within the housing to retain the housing in a central or neutral position relative to the valve member. The housing fluid ports are fluidly connected with the valve member so that axial movement of the housing relative to the valve member in one axial direction fluidly connects the first and second fluid ports in the housing to thereby fluidly connect the source of fluid pressure to the fluid device expansible chamber. Conversely, axial movement of the housing in the other axial direction fluidly connects the second and third fluid ports so that the fluid device expansible chamber is fluidly connected with the low fluid pressure source to exhaust fluid from the expansible chamber.

6 Claims, 3 Drawing Figures

SUPPLY
EXHAUST

FLUID CONTROL VALVE

CROSS REFERENCE TO RELATED APPLICATIONS

This is a continuation, of application Ser. No. 799,041, filed May 23, 1977, now abandoned.

BACKGROUND OF THE INVENTION

I. Field of the Invention

The present invention relates generally to fluid control valves and, more particularly, to a directional control valve for controlling fluid pressure to and from a fluid actuated device.

II. Description of the Prior Art

Fluid powered devices, such as fluid powered lifts and jacks, are widely employed in industry. Such devices are typically pneumatically or hydraulically powered and include an expansible chamber or fluid powered motor for converting pressurized fluid flow to mechanical movement. Thus, by connecting the fluid device to a source of fluid pressure, the fluid device produces mechanical movement in one direction while, conversely, exhaustion of the fluid pressure from the fluid powered device produces mechanical movement in the opposite direction.

In order to supply the desired amount of pressurized fluid to or from the flid powered device, a bidirectional control valve is typically connected with the fluid powered device. These control valves are selectively operable to connect the fluid powered device with a source of fluid pressure, or alternatively, to exhaust pressurized fluid from the fluid powered device. Such previously-known control valves are conventionally actuated by solenoids, a hand lever, pushbuttons, a foot pedal, and the like. In all these cases, however, the valve body is stationary and actuation of the valve means is effected by a spool or similar valve member moving within the valve body and operable to effect directional fluid flow through the valve body.

These directional control valves are disadvantageous in that the valve member must be manually moved to its neutral or inoperative position after the desired degree of actuation of the fluid device is obtained. Failure to immediately do so, of course, requires the reverse operation of the directional control valve in order to return the fluid device to the desired position.

A further disadvantage with many of these previously-known directional control valves, and particularly the solenoid actuated valves, is that while the direction of fluid flow through the control valve is controllable, the flow rate through the control valve is not. Consequently, with this type of previously-known directional control valve, accurate positioning of the fluid powered device is difficult, if not altogether impossible. Moreover, when accurate positioning of the fluid powered device is required, the control valve is actuated in a reiterative fashion until the desired position of the fluid device is obtained. Such a reiterative process is time consuming in practice and therefore costly.

A still further disadvantage of these previously-known directional control valves is that the valve body is stationary relative to the fluid device movable member so that the valve body is stationary regardless of the degree of actuation of the fluid device. This arrangement, however, is disadvantageous in that it prohibits the operator from controlling the movement of the fluid powered device by touch or feel when positioning the fluid powered device.

SUMMARY OF THE PRESENT INVENTION

The present invention provides an improved bidirectional control valve which overcomes the above-mentioned disadvantages of the previously-known control valves and which is relatively inexpensive in construction and yet effective in operation.

In brief, the directional control valve of the present invention comprises a spool valve and a housing having fluid passage means axially slidably disposed over the spool valve. The housing further includes three external fluid ports, a first port adapted for connection with a source of fluid pressure, a second port adapted for connection with the fluid device and a third port adapted for connection with a source of low fluid pressure.

Resilient means contained within the housing retain the housing in a central or neutral position relative to the spool valve so that none of the fluid ports are in fluid communication with each other. However, by axially sliding the housing upwardly relative to the spool valve, the spool valve permits fluid communication between the first and second ports so that fluid from the source of fluid pressure flows through the control valve of the present invention and to the fluid device. Conversely, the housing can be moved axially downwardly relative to the spool valve and against the force of the resilient means to fluidly connect the second and third ports together so that fluid pressure is exhausted from the fluid device and to the source of low fluid pressure.

The control valve of the present invention thus achieves many advantage over the previously-known control valves for fluid devices. In particular, upon release of the housing, it is automatically returned to its central or neutral position, either by gravity acting upon the housing or by the resilient means which rapidly shuts off the control valve.

The control valve of the present invention provides the further advantage that the housing, rather than the valve, is moved in order to actuate the valve. This, in turn, permits the valve member to be directly connected to and movable with the fluid actuated device. By doing so, the operator can position the fluid actuated device by touch or feel to obtain accurate and rapid positioning of the fluid actuated device.

The control valve, according to the present invention, achieves the further advantage that the fluid flow rate through the control valve, and hence to or from the fluid actuated device, is variably controllable which permits variable control of the actuation speed of the fluid device.

A still further advantage of the directional control valve of the present invention and one that will become more fully understood as the description proceeds is that the control valve of the present invention is of simple and inexpensive construction. Nevertheless, the control valve according to the present invention is efficient in operation and enjoys a long and virtually maintenance-free life.

BRIEF DESCRIPTION OF THE DRAWINGS

The fluid control valve of the present invention will be more clearly understood upon reference to the following detailed description when read in conjunction with the accompanying drawing, wherein like reference characters refer to like parts throughout the several views, and in which.

DETAILED DESCRIPTION OF THE PRESENT INVENTION

Figures 1, 2, 3:
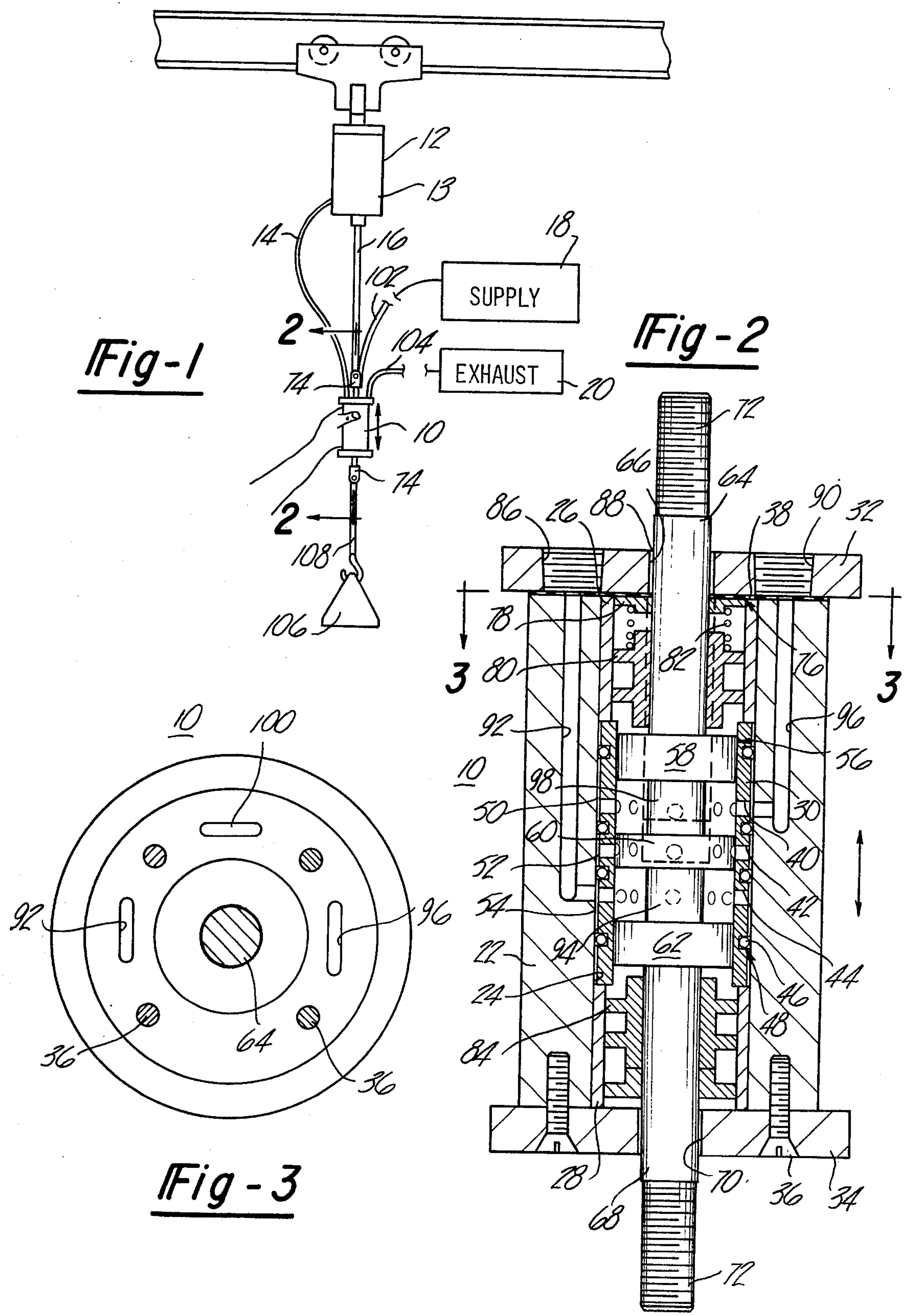
FIG. 1 is a partial diagrammatic plan view illustrating the bidirectional control valve according to the present invention coupled to a fluid device.
FIG. 2 is a side cross-sectional view of the bidirectional control valve of the present invention and enlarged for clarity.
FIG. 3 is a partial sectional view of the bidirectional control valve according to the present invention and taken substantially along line 3—3 in FIG. 2.

With reference first to FIG. 1, the bidirectional control valve 10 of the present invention is thereshown coupled to a fluid device 12 by a fluid line 14. The fluid device 12 shown in FIG. 1 is a fluid actuated lift operable to selectively extend or retract a downwardly extending piston rod and or cable 16. The fluid device 12 typically includes an expansible or working chamber 13 which can be selectively coupled by the valve 10 to a source 18 of fluid pressure via a line 102 to thereby retract the piston rod and/or cable 16 into the device 12. Conversely, the valve 10 can selectively couple the fluid device expansible chamber 13 to a low pressure fluid source or exhaust 20 via a line 104 to thereby lower or extend the piston rod and/or cable 16 from the fluid device 12. The fluid device 12 is preferably pneumatically or hydraulically powered, although, as will become apparent as the description proceeds, any source of fluid pressure can be controlled by the valve 10 of the present invention.

The bidirectional control valve 10 of the present invention is shown in more detail in FIGS. 2 and 3 and comprises an outer tubular cylindrical housing 22 having an axial throughbore 24. A first tubular spacer sleeve 26 is positioned at the upper end of the throughbore 26 while a second tubular spacer sleeve 28 is positioned at the lower end of the axial bore 24 as viewed in FIG. 2. The spacer sleeve 26 and 28 serve to centrally position a tubular and cylindrical valve sleeve 30 in the center of the bore 24. Upper and lower cover plates 32 and 34, respectively, are secured to the housing 22 by appropriate bolts 36 to retain the sleeves 26, 28, and 30 in the bore 24. In addition, appropriate sealing means 38 can be used between the upper cover 32 and the housing 22 to prevent fluid leakage for a reason to become later apparent.

The valve sleeve 30 includes a first, second, and third set of circumferentially spaced ports 40, 42, and 44, respectively, formed therethrough so that each set of ports 40, 42, and 44 is axially spaced along the sleeve 30 from the others. In addition, the outer diameter of the sleeve 30 is smaller than the diameter of the housing bore 24 so that the outer periphery of the sleeve 30 is spaced radially inwardly from the bore 24. Sealing static O-rings 46 are disposed in grooves 48 in the sleeve 30 between adjacent sets of ports 40, 42, and 44 and at each axial end of the sleeve 30. In this fashion the static O-rings 46 define an upper annular fluid chamber 50, a central annular fluid chamber 52, and a lower annular fluid chamber 54 between the sleeve 30 and the housing 32 which are fluidly separate from each other.

A spool valve 56 having three axially spaced lands 58, 60, and 62 is disposed in the housing bore 24 so that the outer periphery of each land 58, 60, and 62 slidably and sealingly engages the inner surface of the valve sleeve 30. An upper axial rod portion 64 of the spool valve 56 extends upwardly through a central hole 66 in the upper cover 32 while, similarly, a lower rod portion 68 extends outwardly from the housing 22 through a central hole 70 in the lower cover 34. The free end of both rod portions 64 and 68 is preferably threaded at 72 for attachment with an appropriate attachment member 74 (FIG. 1).

Alternatively, the spool valve 56 can be of the spool O-ring or quad-ring type. In this case the O-rings or quad-rings would either be mounted in grooves formed on the spool valve 56 or held in position by appropriate spacers. In either case the O-rings or quad-rings would sealingly engage the inner surface of the valve sleeve 30.

An upper spacer 76 having an upper part 78 and lower part 80 is positioned around the upper rod portion 64 between the cover 32 and the upper valve land 58 within the tubular sleeve 26. A helical spring 82 is disposed between the two parts 78 and 80 of the spacer 76 which urges the spacer lower part 80 against the top of the spool valve land 58. The helical spring 82 has a spring constant such that the spring 82 can maintain the spaced relationship between the spacer parts 78 and 80 while supporting the weight of the housing 22 and its attached components.

A lower spacer 84 is similarly positioned around the lower rod portion 68 between the lower cover 34 and bottom valve land 62 within the sleeve 28. The axial length of the lower spacer 84 is less than the distance between the bottom cover 34 and the bottom land 62 so that the housing can be moved upwardly relative to the spool valve 56.

Three fluid ports 86, 88, and 90 are provided in the housing top cover 32 and are preferably threaded for connection with a conventional fluid connector (not shown). The first fluid port 86 registers with one end of a passageway 92 in the housing 22 which is open at its other end to the lowermost annular chamber 54. The port 86 thus fluidly communicates with a fluid chamber 94 between the spool valve lands 60 and 62 via the lower sleeve apertures 44. Similarly, the port 90 is in registry with one end of a passageway 96 in the housing 22 which is open at its other end to the uppermost annular chamber 50. The port 90, thus, communicates with a fluid chamber 98 defined between the spool valve land 58 and 60 via the upper sleeve apertures 40. Finally, the port 88 is in registry with one end of a passageway 100 in the housing 22 which is open at its other end of the central annular chamber 52. Thus, the port 88 is in fluid communication with the central apertures 42 in the sleeve 30. As will subsequently be described in greater detail, the apertures 42 are normally covered and, therefore, closed by the central spool valve land 60.

The port 88 is connected by the fluid connector 14 to the fluid device 12 while the port 96 is connected to the pressurized fluid supply 18 by the fluid line 102. Lastly, the port 86 is connected to the exhaust 20 by the fluid line 104.

With reference to FIGS. 1 and 2, in operation the upper rod portion 64 of the spool valve 56 can be advantageously connected by the attachment member 74 to the extendible and retractable piston rod and/or cable 16 from the fluid device 12. Simultaneously, a load 106 can be attached to the lower rod portion 68 of the spool valve 56 via the lower attachment member 74 so that the spool 56 moves in unison with the cable 16. Alternatively, of course, the ends of the spool valve 56 can be secured between two stationary fixed supports remote from the fluid device 12 and at an operating station convenient to the operator.

With the control valve 10 fluidly connected, as previously described, to the fluid device 12, pressure supply 18, and the exhaust 20, a downward movement of the housing 22 relative to the spool valve 56 and against the force of the helical spring 82 will expose both the central ports 42 and lower ports 44 in the sleeve 30 to the lower fluid chamber 94. This, in turn, fluidly connects the fluid device 12 to the exhaust 20 via the chamber 94 and the passageways 92 and 100 in the housing 22. The subsequent release of the housing 22 returns the housing 22 to its central or neutral position (shown in FIG. 2) by the action of the helical spring 82. In its central or neutral position, the spool valve 56 covers and therefore closes off the ports 42 in the housing 22 and thus prevents further fluid flow to or from the fluid device 12.

Conversely, the housing 22 can be moved upwardly relative to the spool valve 56 until the lower valve land 62 abuts against the spacer 84. This movement exposes both the upper ports 40 and the central ports 42 in the sleeve 30 to the upper fluid chamber 98. This, in turn, fluidly connects the fluid device 12 with the pressure supply 18 via the chamber 98 and the passageways 96 and 100 in the housing 22. Upon release of the housing 22, the weight of the housing 22 with its attached components will again return the housing 22 to its central or neutral position shown in FIG. 2 which again precludes further fluid flow to or from the fluid device 12.

It can thus be seen that the control valve differs from other control valves of its type in that the housing 22 is moved relative to the valve member 56 rather than vice versa. This not only permits easy manipulation of the control valve 10, but also permits the valve member 56 to be directly mechanically connected with the fluid device 12 and load 106 via the end connectors 74. With the control valve 10 mechanically coupled to the cable and/or piston rod 16, the operator can control the position of the cable and/or piston rod by feel or touch which aids the operator to accurately position the cable and/or piston rod 16.

The control valve 10 of the present invention enjoys the further advantage that, upon release of the control valve housing 22, the housing 22 automatically returns to its central or neutral position which rapidly terminates further fluid flow to or from the fluid device 12 as a safety factor.

A still further advantage of the control valve 10 of the present invention is that the fluid flow rate through the valve 10 and, thus, to or from the fluid device 12, can be controlled by controlling the axial displacement of the housing 22 relative to the spool valve 56. Thus, a slight axial displacement of the housing 22 uncovers only a portion of the central ports 42 in the valve sleeve 30 which restricts or limits the fluid flow through the control valve 10. Conversely, of course, full axial displacement of the housing 22 relative to the spool valve 56 in either axial direction with totally uncover all of the ports 42 in the sleeve 30 to either the fluid chamber 98 or 94 and permit rapid fluid flow to or from the fluid device 12.

The control valve 10 of the present invention enjoys the further advantage that it is relatively inexpensive to construct and yet durable and long-lasting in operation. Moreover, only the spool valve 56 and its associated valve sleeve 30 require precision machining while the remaining components of the valve 10 can be constructed with relatively large tolerances which reduces manufacturing costs.

Moreover, while the valve 10 has been described as a three port valve, it will also be understood that the valve 10 could instead comprise a two-way or four-way porting arrangement. In the case of the two-way porting arrangement, the air supply would be connected to the output port and actuation of the valve 10 would shut off the air supply. Conversely, in a four-way porting arrangement the air supply would be blocked with the valve in the neutral or central position and both of the outlet ports would be open to the atmosphere. Upward movement of the valve body would connect the air supply with one outlet port while downward movement of the valve body would connect the air supply with the other outlet port. The four-way porting arrangement can be advantageously employed with a reversible air motor oftentimes found in hoists or the like.

As a further advantage, the control valve 10 need not be mounted in the lifting column but can alternatively be mounted remotely on a fixture between two fixed points. This would be desirable if the fixture is of a size which would make it impractical for the operator to grasp the control. Moreover, the same degree of fuel and sensitivity is achieved when the control valve 10 is mounted in this fashion.

Having thus described my invention, many modifications thereto will become apparent to those skilled in the art to which it pertains without deviating from the spirit of the invention as defined by the scope of the appended claims.

I claim:

1. A fluid control valve comprising:

a valve member;

a housing axially slidably disposed over said valve member, said housing having a first, second, and third fluid passageways open to said valve member, each of said fluid passageways being formed axially through the housing;

means for resiliently retaining said housing in a predetermined axial position relative to said valve member whereby said fluid passageways are disconnected from each other, said resilient retaining means being wholly contained within said housing;

wherein said valve member fluidly connects said first and second fluid passageways when said housing is moved in one axial direction from said predetermined position and wherein said valve member fluidly connects said first and third fluid passageways when said housing is moved in the other axial direction from said predetermined position;

wherein said valve member is a spool valve disposed in a bore formed in said housing;

wherein said housing has a bore in which the valve member is positioned and wherein said first, second, and third fluid passageways are fluidly connected to said housing bore at axially spaced positions, said first bore being axially positioned between said second and third passageways in said housing bore, and wherein said valve member includes at least one land which closes said first passgeway when said housing is in said predetermined position, and a tubular valve sleeve disposed in said housing bore, said spool valve being slidably sealingly received through said valve sleeve, said valve sleeve being spaced radially inwardly from said housing bore, and sealing means being disposed between said valve sleeve and said housing bore for defining an upper fluid chamber, a central fluid chamber and a lower fluid chamber between said valve sleeve and said housing bore, said fluid chambers being annular in cross section and axially adjacent each other, wherein said first passageway communicates with said central annular chamber while said second and third passageways repsectively communicate with the upper and lower annular fluid chambers, respectively, and at least one aperture formed through said valve sleeve for each of said annular chambers.

2. The invention as defined in claim 1 and including a plurality of circumferentially spaced apertures formed through said valve sleeve for each of said annular chambers.

3. The invention as defined in claim 1 wherein said valve member includes at least three axially spaced lands which define two axially separated fluid chambers and wherein said second passageway is fluidly coupled to one fluid chamber while said third passageway is coupled with the other fluid chamber.

4. The invention as defined in claim 1 wherein said valve member fluidly connects said first and second fluid passageways when said housing is manually gripped on a hand gripping portion formed by the outer periphery of said housing and moved in said one axial direction from said predetermined position, and wherein said valve member fluidly connects said first and third fluid passageways when said housing is manually gripped on said hand gripping portion and moved in said other axial direction from said predetermined position.

5. The invention as defined in claim 1 wherein said first fluid passageway is connected to a fluid powered device, said second passageway is connected to a source of fluid pressure, and said third passageway is connected to a source of low pressure fluid.

6. The invention as defined in claim 5 wherein said fluid device includes a member movable in response to the actuation of said device and wherein said valve member is mechanically coupled to said movable member.

* * * * *

UNITED STATES PATENT AND TRADEMARK OFFICE

CERTIFICATE OF CORRECTION

PATENT NO. : 4,243,060

DATED : January 6, 1981

INVENTOR(S) : Lorne J. McKendrick

It is certified that error appears in the above-identified patent and that said Letters Patent are hereby corrected as shown below:

Column 1, line 29, delete "flid" and insert --fluid-- therefor;

Column 3, line 39, delete "sleeve" and insert --sleeves-- therefor;

Column 5, line 59, delete "with" and insert --will-- therefor;

Column 6, line 24, delete "fuel" and insert --feel-- therefor;

Signed and Sealed this

*Sixteenth* Day of *June 1981*

[SEAL]

*Attest:*

RENE D. TEGTMEYER

*Attesting Officer* *Acting Commissioner of Patents and Trademarks*